Nov. 29, 1966 KOICHI TAKEUCHI ETAL 3,289,147

MICROSOCKETS

Filed June 15, 1964

Koichi Takeuchi
Asao Shikama
Shozo Takeno
INVENTOR.

BY George B. Oujevolk
Attorney

United States Patent Office 3,289,147

Patented Nov. 29, 1966

3,289,147

MICROSOCKETS

Koichi Takeuchi, Shinagawa-ku, Tokyo, Asao Shikama, Kawasaki-shi, and Shozo Takeno, Yokohama-shi, Japan, assignors to Tokyo Shibaura Electric Co., Ltd., Kawasaki-shi, Japan, a corporation of Japan Filed June 15, 1964, Ser. No. 374,917
Claims priority, application Japan, June 22, 1963 (utility model), 38/46,409
3 Claims. (Cl. 339—176)

This invention relates to improvements of microsockets having a large number of poles or terminals and small spacings between pins and adapted to be used in connection with output terminals of printed circuit boards on which magnetic film memory elements and the like electrical circuit components are mounted.

Conventional socket adapted to cooperate with output terminals of a printed circuit board supporting magnetic film memory elements and the like, comprises a rectangular trough shaped frame member, which has a series of electrode receiving pins and slots which are disposed on a straight line on each inner wall surface corresponding to opposing longitudinal sides of the frame, and a plurality of projections provided adjacent to and alternate with said openings and slots. The socket is fabricated by inserting electrode pins into said openings and slots and then moulding them together. However, with such a construction as the spacing between adjacent pins is small and as the thickness of the walls of the frame is very thin it is very difficult to accurately machine metal molds which are utilized in the moulding process. In addition there is a defect that the molded frame members have a tendency to crack.

The principal object of this invention is to provide an improved multiple microsocket of extremely small size and suitable for use with printed circuit boards.

Further object of this invention is to provide an improved construction of a microsocket having very small spacings between adjacent pins and can be manufactured easily.

Still further object of this invention is to provide an improved microsocket which is free from any crack due to heat shrinkage of a plastic material comprising the frame member.

In accordance with this invention these and other objects can be attained by providing an improved microsocket comprising a trough shaped inner frame member having a plurality of electrode pin receiving slots on the opposing inner walls thereof, a trough shaped outer frame member adapted to receive therein said inner frame member and having a plurality of electrode pin receiving slots corresponding to said slots of the inner frame member and a plurality of electrode pins respectively mounted in corresponding pairs of said slots. Each of the electrode pins is preferably in the form of letter U and one of its legs is inserted into a perforation provided by one of the slots of the outer frame member to extend beyond the bottom surface thereof whereas the other leg is bent into a corresponding one of said slots of the inner frame member and when assembled the inner and outer frame members and the electrode pins mounted thereon are bound integrally by means of a suitable adhesive.

While the specification concludes with claims particularly pointing out and distinctly claiming the subject matter which are regarded the invention it is believed that the invention will be better understood from the following description taken in connection with the accompanying drawings, in which:

Figure 1:
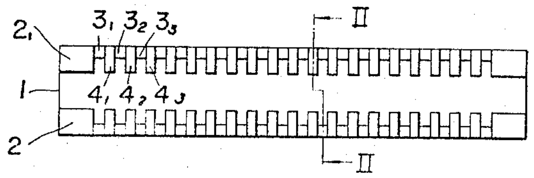
FIG. 1 shows a front elevation of an inner frame member comprising a microsocket according to this invention.
Figure 2:
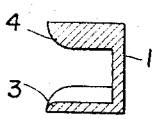
FIG. 2 shows a cross section of the inner frame member taken along a line II—II of FIG. 1.
Figure 3:
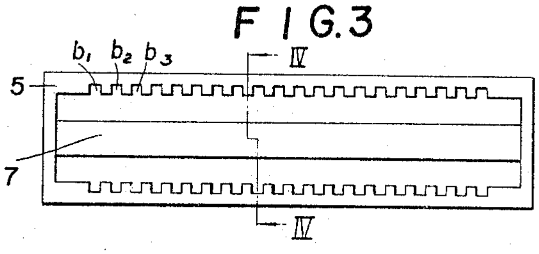
FIG. 3 shows a front elevation of an outer frame member comprising the microsocket of this invention.
Figure 4:
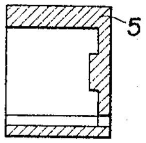
FIG. 4 shows a cross section of the outer frame member taken along a line IV—IV of FIG. 3.
Figure 5:
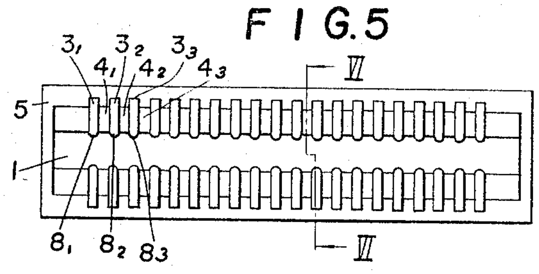
FIG. 5 shows a front view of a completed microsocket embodying this invention.
Figure 6:
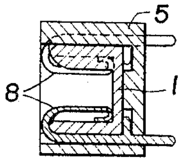
FIG. 6 shows a cross section of the completed microsocket taken along a line VI—VI of FIG. 5.

Referring now to the accompanying drawings, as shown in FIGS. 1 and 2, a plurality of slots $3_1$, $3_2$, $3_3$ . . . adapted to receive electrode pins, not shown, and a plurality of projections $4_1$, $4_2$, $4_3$ . . . are formed on the surface of opposing inner walls $2_1$ and $2_2$ of a trough shaped inner frame member 1, said slots and projections alternating with each other. As shown in FIGS. 3 and 4 rectangular trough shaped outer frame 5 is provided to fit around the outer walls of the inner frame member 1. On the opposing inner walls of the outer frame member are provided a series of electrode pin receiving slots $6_1$, $6_2$, $6_3$ . . . to respectively oppose against said slots $3_1$, $3_2$, $3_3$ . . . of the inner side frame, the number and dimensions of the slots of the outer frame member being the same as those of the inner frame member. Although the inner and outer frame members may be made of a molded plastic material they can be made of any other insulating material. The microsocket of this invention is fabricated by applying a suitable adhesive on the inner bottom surface of the outer frame, a member 7, inserting the inner frame member 1 in the outer frame member 7, inserting one leg of a U-shaped electrode pin 8 to extend through one of the perforations constituted by the slots $6_1$, $6_2$, $6_3$ . . . of the outer frame members, and bring the other leg of the electrode pins into firm engagement with corresponding one of the electrode pin receiving slots $3_1$, $3_2$, $3_3$ . . . of the inner frame member thus anchoring the electrode pins. With this construction when terminals (not shown) of a printed circuit board supporting magnetic film memory elements and the like, for example, are inserted between opposing inner walls of the trough shaped inner frame member 1 the terminals will be firmly clamped between resilient inner legs of the U-shaped electrode pins to establish electrical connections.

Since the microsocket of this invention has such a construction that wherein a frame including the inner and outer frame members and electrode pins are united by adhesive into a unitary structure there is no fear of forming cracks in the frame as in the prior art microsocket which has been fabricated by molding the electrode pins in a frame member. In the prior construction cracks were formed during molding due to difference in shrinkage between a plastic material constituting the frame and the electrode pins. Moreover, this invention enables to accurately machine or work thin and long pin receiving slots, thus greatly simplifies manufacturing process of microsockets.

While the invention has been explained by describing a particular embodiment thereof, it will be apparent that improvements and modifications may be made without departing from the scope and spirit of the invention as defined in the appended claims.

What is claimed is:

1. A microsocket comprising a trough shaped inner frame member made of a plastic material and formed with a plurality of electrode pin receiving slots on the opposing inner walls of the trough, a trough shaped outer frame member made of a plastic material and provided with a plurality of electrode pin receiving slots on its inner walls corresponding to said electrode pin receiving slots of said inner frame member, said inner frame member being fit in said outer frame member, and a plurality of U-shaped electrode pins, one leg of each of said pins being received in a perforation defined by one of said slots of the outer frame member to extend beyond the bottom wall thereof and the other leg being bent into engagement with a corresponding one of said slots of said inner frame member, said inner and outer frame members and said electrode pins being bounded into a unitary structure by means of an adhesive.

2. A microsocket comprising a trough-shaped inner frame member made of a plastic material and formed with a plurality of electrode-pin receiving slots on the opposing inner walls of said member and a plurality of protuberances arranged alternately between adjacent slots, a trough-shaped outer frame member also made of a plastic material and formed with a plurality of electrode-pin receiving slots on the inner walls of said second member, said outer frame member being adapted to fit snugly on said inner frame member with said plurality of slots of the outer frame member which have the same dimensions with those of the slots of the inner frame member which are aligned with said slots of the inner frame member, and a plurality of U-shaped electrode pins, one leg of each of said pins being received in a space defined by one of said slots of the inner and outer frame members when both members are assembled together and passed through the electrode-pin receiving slot of the outer frame member to the outside of said outer frame member and the other leg being bent into engagement with a corresponding one of said slots of said inner frame member, said inner and outer frame members and said electrode pins being bound into a unitary structure by means of an adhesive.

3. A microsocket comprising a trough-shaped inner frame member made of a plastic material and formed with a plurality of electrode-pin receiving slots in the opposing inner walls of said member, a trough-shaped outer frame member also made of a plastic material and formed with a plurality of electrode-pin receiving slots on the inner walls of said second member, said outer frame member being adapted to fit snugly on said inner frame member, said outer frame member also being formed at the bottom with a ridge portion adapted to be in contact with the outside of the bottom of said inner frame member, and a plurality of U-shaped electrode pins, one leg of each of said pins being passed through the corresponding electrode-pin receiving slot of the outer frame member and the other leg being bent into engagement with a corresponding one of said slots of said inner frame member, each of said pins having a retention extending therefrom and to be locked in the space defined by said ridge portion, said inner and outer frame members and said electrode pins being bound into a unitary structure by means of an adhesive.

References Cited by the Examiner

UNITED STATES PATENTS

| | | | |
|---|---|---|---|
| 2,537,820 | 1/1951 | Flood | 339—63 |
| 2,870,424 | 1/1959 | Franz | 339—17 |
| 2,874,363 | 2/1959 | Ainsworth | 339—176 X |
| 2,935,725 | 5/1960 | Fox | 339—176 X |

EDWARD C. ALLEN, *Primary Examiner.*

W. DONALD MILLER, *Examiner.*